(12) United States Patent
Park et al.

(10) Patent No.: US 7,588,303 B2  
(45) Date of Patent: Sep. 15, 2009

(54) HEAD DRIVING DEVICE, INKJET PRINTER COMPRISING THE SAME, AND DATA PROCESSING METHOD THEREOF

(75) Inventors: Kyoung-sik Park, Seoul (KR); Eun-bong Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 204 days.

(21) Appl. No.: 11/519,782

(22) Filed: Sep. 13, 2006

(65) Prior Publication Data

US 2007/0070104 A1 Mar. 29, 2007

(30) Foreign Application Priority Data

Sep. 26, 2005 (KR) .................. 10-2005-0089495

(51) Int. Cl.
*B41J 2/205* (2006.01)
(52) U.S. Cl. .................. 347/12; 347/15
(58) Field of Classification Search .......... 347/12, 347/15, 40, 43, 9–11; 358/1.2, 1.9
See application file for complete search history.

(56) References Cited

U.S. PATENT DOCUMENTS

2004/0080554 A1* 4/2004 Kim .................. 347/12

FOREIGN PATENT DOCUMENTS

| CN | 1074770 A | 7/1993 |
|---|---|---|
| CN | 1662380 A | 8/2005 |
| JP | 2000-339128 | 12/2000 |
| KR | 1019970003337 B1 | 3/1997 |
| KR | 1020040021524 A | 3/2004 |

* cited by examiner

*Primary Examiner*—Lamson D Nguyen  
(74) *Attorney, Agent, or Firm*—Roylance, Abrams, Berdo & Goodman, L.L.P.

(57) ABSTRACT

A head driving device, an inkjet printer comprising the same and data processing method of an ink jet printer are provided, in which a nozzle driving unit turns on/off a plurality of thermal elements that correspond to a plurality of nozzles and heat ink discharged from the nozzles, a data processing unit processes printing data and outputs a nozzle select signal corresponding to an image to the nozzle driving unit; and a head logic unit receives the printing data externally, divides the printing data of one address group into a plurality of data groups, transmits the plurality of data groups to the data processing unit via different data buses corresponding to the plurality of data groups, respectively, and controls the data processing unit to process the divided printing data. Accordingly, an EMI characteristic between signals can be improved by lowering the data buses density in one area, and a data processing speed can be adjusted by dividedly processing printing data.

14 Claims, 5 Drawing Sheets

HEAD DRIVING DEVICE, INKJET PRINTER COMPRISING THE SAME, AND DATA PROCESSING METHOD THEREOF

CROSS-REFERENCE TO RELATED APPLICATIONS

This application claims the benefit under 35 U.S.C. § 119(a) of Korean Patent Application No. 2005-0089495, filed on Sep. 26, 2005, in the Korean Intellectual Property Office, the entire disclosure of which is hereby incorporated by reference.

BACKGROUND OF THE INVENTION

1. Field of the Invention

The present invention relates to a head driving device, an inkjet printer comprising the same, and a data processing method thereof. More particularly, the present invention relates to a head driving device, an inkjet printer comprising the same, and a data processing method thereof, which is capable of reducing electromagnetic interference (EMI) and processing data at a high speed when printing data are transmitted via an internal data bus.

2. Description of the Related Art

In general, a printer is a means for printing information processed by external equipment, such as a computer, on a record medium and may include a wired dot method, a thermal transfer method and an inkjet method according to a print method of a print head.

The print head of the inkjet printer has a plurality of nozzles for jetting ink to form images on a record paper according to a print instruction. In a printing mechanism of the inkjet printer, the print head is a print device for embodying a requested printing operation and is driven by a head driving device to perform the printing operation by jetting a proper amount of print ink on the record paper.

FIG. 1 is a control block diagram illustrating a head driving device of a conventional inkjet printer.

As shown in FIG. 1, the head driving device of the conventional inkjet printer includes a shift register I for storing serial printing data output from a head controller of the inkjet printer according to a serial clock synchronization signal, a latch 2 for latching the printing data input to the shift register I according to a load signal, a gate array 3 for performing an AND operation between a latched signal and a jet pulse, and a field effect transistor (FET) array 4 being turned on/off according to an output signal of the gate array 3 and applying a voltage of Vph to thermal elements of the nozzles, thereby discharging ink of a relevant nozzle.

Here, for the purpose of convenience of explanation, assuming that the number of an address group is one and data are composed of 10 bits, a total number of nozzles through which ink can be discharged at a time is 10, which is a product of the data and the address.

As shown in FIG. 1, the data are latched according to the load signal. Such a latch operation is performed in a similar manner in an address group for each nozzle. In addition, the latched data are output to the FET array 4, which is a final stage for ink discharge, together with the jet pulse, via the gate array 3.

As mentioned above, the head driving device receives the serial printing data from the head controller and outputs the data of 10 bits corresponding to one address to the FET array 4 at a time. As a result, since data buses in the head driving device are elongated in one way, a problem may arise in which deterioration of an EMI characteristic occurs between signals.

Accordingly, there is a need for an improved head driving device in an inkjet printer and a data processing method that improves an EMI characteristic between signals.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a head driving device, an inkjet printer comprising the same, and a data processing method thereof, which is capable of improving an EMI characteristic between signals by lowering density of data buses in one area, and adjusting a data processing speed by dividedly processing printing data.

The foregoing and/or other aspects of exemplary embodiments of the present invention can be achieved by providing a head driving device of an inkjet printer, in which a nozzle driving unit turns on/off a plurality of thermal elements that correspond to a plurality of nozzles and heat ink discharged from the nozzles; a data processing unit for processing printing data and outputting a nozzle select signal corresponding to an image to the nozzle driving unit; and a head logic unit for receiving the printing data from the outside, dividing the printing data of one address group into a plurality of data groups, transmitting the plurality of data groups to the data processing unit via different data buses corresponding to the plurality of data groups, respectively, and controlling the data processing unit to process the divided printing data.

According to an aspect of exemplary embodiments of the invention, the data buses corresponding to the plurality of data groups are arranged separately for the respective data groups.

According to an aspect of exemplary embodiments of the invention, the head logic unit divides the printing data of one address group into first group data and second group data, and the data buses comprises a first data bus which the first group data are transmitted and a second data bus which the second group data are transmitted.

According to an aspect of exemplary embodiments of the invention, the data processing unit comprises a first data processing unit for processing the first group data transmitted via the first data bus and a second data processing unit for processing the second group data transmitted via the second data bus, the first data processing unit and the second data processing unit being arranged separately.

According to an aspect of exemplary embodiments of the invention, the first data processing unit and the second data processing unit are arranged in left and right sides of the nozzle driving unit, respectively.

According to an aspect of exemplary embodiments of the invention, the data processing unit comprises a shift register for delaying the nozzle select signal corresponding to the image to be recorded, according to a clock synchronization signal, and a latch for latching the nozzle select signal according to a latch clock.

According to an aspect of exemplary embodiments of the invention, the head logic unit converts serial data transmitted externally into parallel data.

Another aspects of exemplary embodiments of the present invention can be achieved by providing an inkjet printer, in which a system head controller processes printing data transmitted externally; and a head comprising a nozzle driving unit turns on/off a plurality of thermal elements that correspond to a plurality of nozzles and heat ink discharged from the plurality of nozzles, a data processing unit processes the printing data and output a nozzle select signal corresponding to an image to the nozzle driving unit, and a head logic unit receives the printing data from the system head controller, divides the printing data of one address group into a plurality of data groups, transmits the plurality of data groups to the data processing unit via different data buses corresponding to the plurality of data groups, respectively, and controls the data processing unit to process the divided printing data.

According to an aspect of exemplary embodiments of the invention, the data buses corresponding to the plurality of data groups are arranged separately for the respective data groups.

According to an aspect of exemplary embodiments of the invention, the head logic unit divides the printing data of one address group into first group data and second group data, the data buses comprise a first data bus which the first group data are transmitted and a second data bus which the second group data are transmitted, and the data processing unit comprises a first data processing unit for processing the first group data transmitted via the first data bus and a second data processing unit for processing the second group data transmitted via the second data bus, the first data processing unit and the second data processing unit being arranged separately.

According to an aspect of exemplary embodiments of the invention, each of the first data processing unit and the second data processing unit comprises a shift register for delaying the nozzle select signal corresponding to the image to be recorded, according to a clock synchronization signal, and a latch for latching the nozzle select signal according to a latch clock.

According to an aspect of exemplary embodiments of the invention, the first data processing unit and the second data processing unit are arranged in left and right sides of the nozzle driving unit, respectively.

Still other aspects of exemplary embodiments of the present invention are achieved by providing a data processing method of an inkjet printer comprising a head and a system head controller for outputting printing data to the head, in which printing data output is received from the system head controller; the printing data of one address group is divided into a plurality of group data; the plurality of group data is transmitted via different data buses corresponding to the plurality of group data, respectively; the transmitted group data for each data group is processed dividedly and a nozzle select signal corresponding to an image is output; and a plurality of thermal elements that correspond to a plurality of nozzles and heat ink discharged from the nozzles is turned on/off, according to the nozzle select signal.

According to an aspect of exemplary embodiments of the invention, the data buses corresponding to the data groups are arranged separately for the respective data groups.

According to an aspect of exemplary embodiments of the invention, the printing data of one address group is divided into a plurality of group data, wherein the plurality of group data comprises a first group data and second group data, and the data buses comprises a first data bus which the first group data are transmitted and a second data bus which the second group data are transmitted.

According to an aspect of exemplary embodiments of the invention, the transmitting of the plurality of group data via different data buses corresponding to the plurality of group data comprises transmitting the first group data via a first data bus and transmitting the second group data via a second data bus, and the outputting of the nozzle select signal corresponding to an image comprises processing the first group data and processing the second group data.

Other objects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
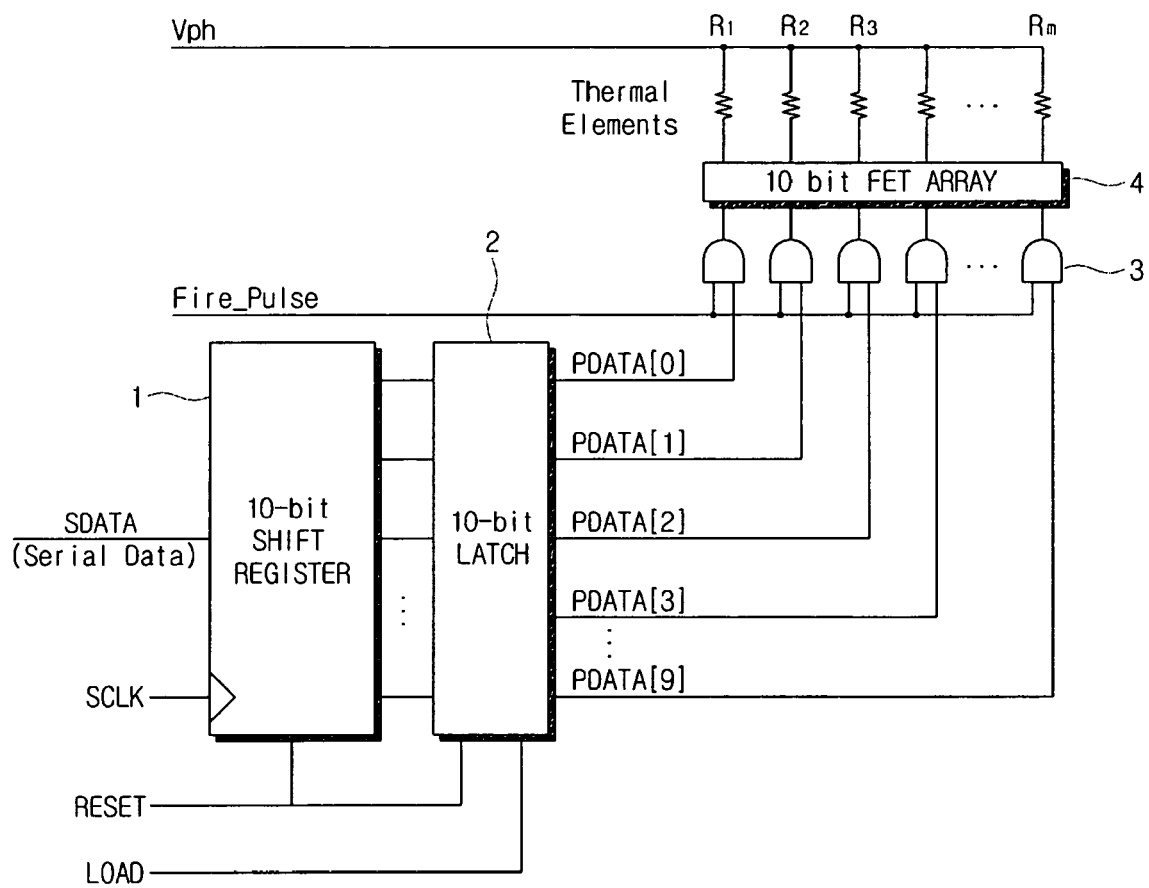
FIG. 1 is a control block diagram illustrating a head driving device of a conventional inkjet printer.
Figure 2:
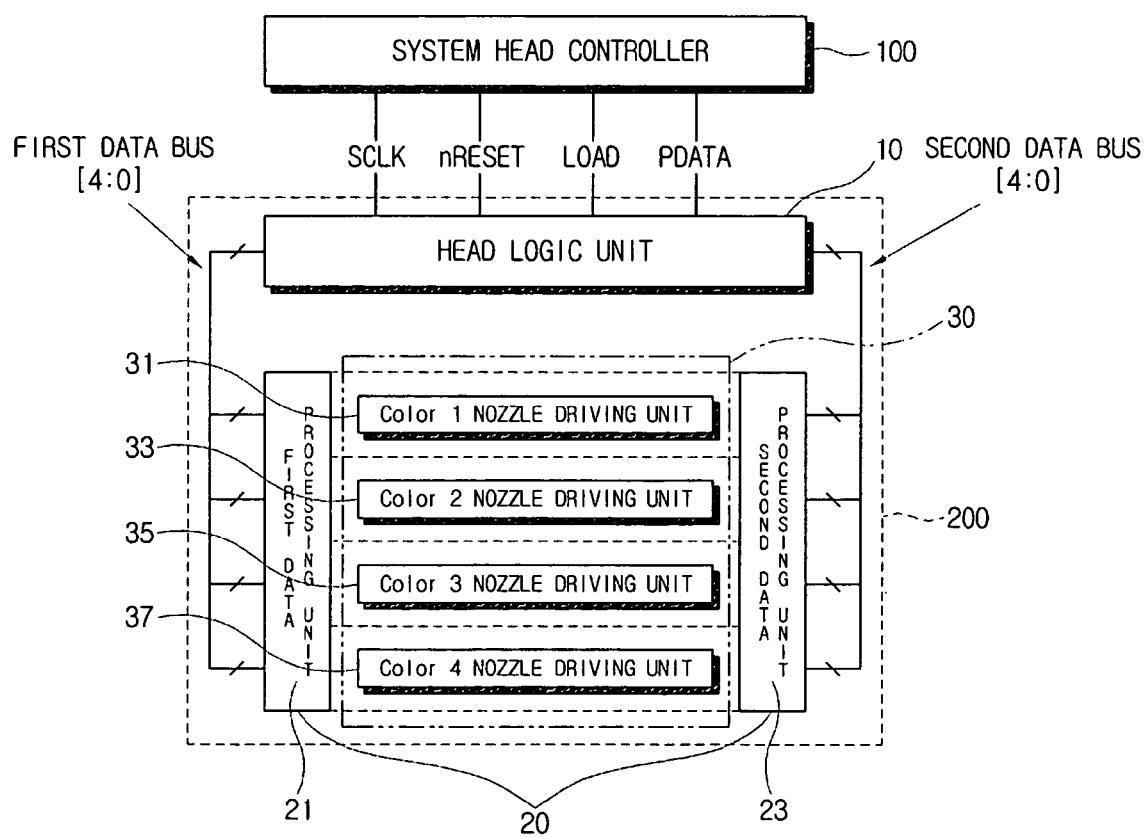
FIG. 2 is a control block diagram illustrating an inkjet printer according to an exemplary embodiment of the present invention.

FIG. 2 is a control block diagram illustrating an inkjet printer according to an exemplary embodiment of the present invention.

As shown in FIG. 2, an inkjet printer according to an exemplary embodiment of the present invention includes a system head controller 100 for converting parallel printing data received from an external source such as a computer into serial printing data and outputting the serial printing data to a head together with control signals such as a serial clock signal and a load signal, and a head driving device 200 for converting the serial printing data received from the system head controller 100 into parallel printing data according to a control signal and outputting a nozzle select signal to a plurality of nozzles.

The head driving device 200 according to an exemplary embodiment of the present invention includes a head logic unit 10, a data processing unit 20, and a nozzle driving unit 30. Here, the head logic unit 10 divides the printing data input from the system head controller 100 and outputs the divided printing data to the data processing unit 20. Then, the data processing unit 20 processes the printing data input under control of the head logic unit 10 according to a format of the nozzle driving unit 30 and outputs the processed printing data to the nozzle driving unit 30.

In an exemplary implementation, the data processing unit 20 includes a first data processing unit 21 and a second data processing unit 23. In addition, as shown in FIG. 2, the head logic unit 10 is connected to the first data processing unit 21 via a first data bus and to the second data processing unit 23 via a second data bus. The first data bus and the second data bus are separated in the left and right side of the nozzle driving unit 30, thus reducing density of the data buses and improving an EMI characteristic.

The head driving device 200 will be described in detail below with reference to FIGS. 3 and 4.

The head logic unit 10 converts the serial data received from the system head controller 100 into the parallel data, processes the printing data input from the system head controller 100 in synchronization with a clock synchronization signal, and converts the processed printing data into a format adaptable to the first data processing unit 21 and the second data processing unit 23. The head logic unit 10 may include a shift register and a latch for converting the serial data into the parallel data.

The printing data P_DATA (Primitive DATA) received from the system head controller 100, which is a nozzle select signal for driving one nozzle selected from a plurality of nozzles of a head corresponding to an image, are applied to the nozzle driving unit 30 by the head logic unit 10 and the data processing unit 20. The printing data P_DATA includes address data and fire data. For example, if the head has nm nozzles, the address data is a signal for selecting an address group for discharging ink from n nozzles at a time and the fire data is data for selecting a nozzle from which ink is discharged, among m nozzles in each address group. In an exemplary implementation, for the purpose of convenience of explanation, it is assumed that the number of address groups is one and the fire data belonging to one address group are composed of 10 bits.

Figure 3:
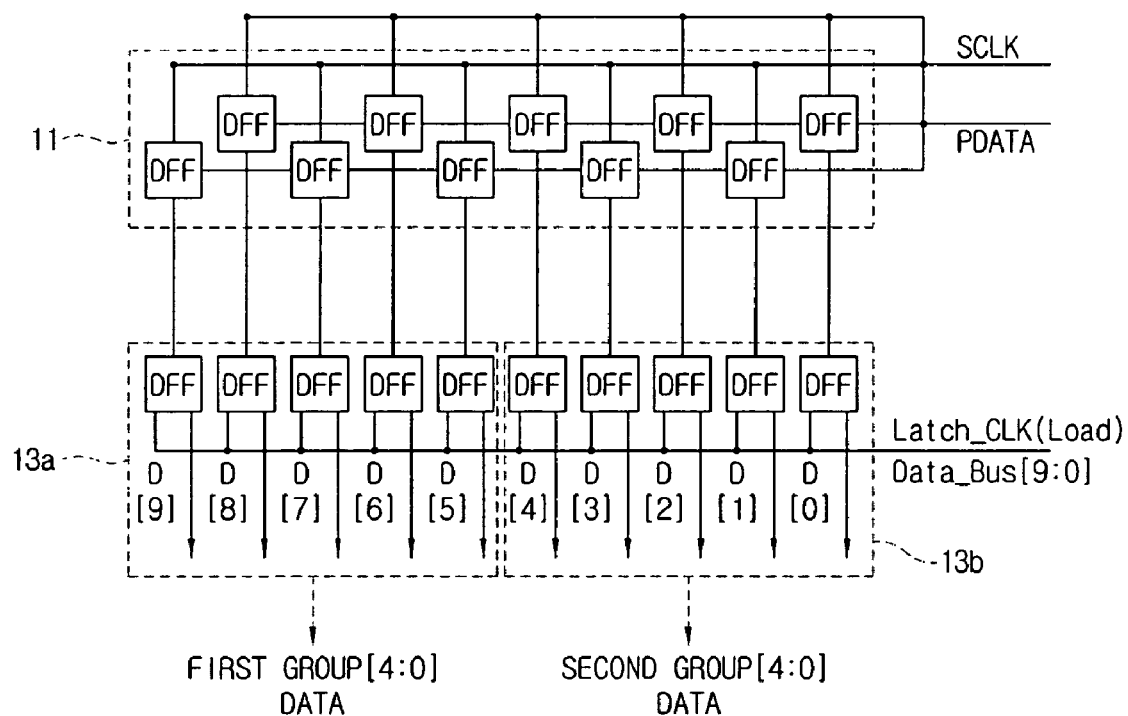
FIG. 3 is a detailed view of a head logic unit according to an exemplary embodiment of the present invention.

FIG. 3 is a detailed view of the head logic unit 10 according to an exemplary embodiment of the present invention.

As shown in FIG. 3, the head logic unit 10 includes a shift register 11 for sequentially storing the serial printing data in synchronization with a serial clock synchronization signal, and first and second latches 13a and 13b for latching the printing data stored in the shift register 11 in synchronization with a latch clock synchronization signal. Each of the shift register 11 and the latches 13a and 13b comprises a plurality of D-flip flops (DFFs).

In an exemplary implementation, the head logic unit 10 may adjust a number of data bits output at a time, according to a circuit design, for example, the number of DFFs in a circuit. For example, if one packet of 60 bits is input from the system head controller 100 to the head logic unit 10, the head logic unit 10 divides the 60 bit packet by the unit of 10 bits and processes data of 10 bits as one address group. A 10-bit shift register and a 10-bit latch are used to process one address group.

In other words, the head logic unit 10 outputs the input serial printing data as the parallel data of 10 bits at a time.

At this time, the head logic unit 10 divides 10 bit data of one address group into two address groups, each of which has 5 bit data, to be processed by the first data processing unit 21 and the second data processing unit 23, respectively. Such division of address group may be implemented by a predetermined algorithm. Although it is shown in FIG. 3 that the data are divided into first group data and second group data in the left and right sides, respectively, depending on the position of DFFs of the latch, criterion of the division may be varied depending on a circuit design.

Hence, the first group data and the second group data obtained in the head logic unit 10 are transmitted to the data processing unit 20 via the first data bus and the second data bus, respectively. As described above, the first data bus and the second data bus are arranged in the left and right sides of the head driving device 200, respectively. Accordingly, since the density of the data buses in one head area is reduced, the EMI characteristic can be improved, which may result in the increase of data processing speed.

As described above, the data processing unit 20, according to an exemplary embodiment of the present invention includes the first data processing unit 21 and the second data processing unit 23, which are arranged in the left and right sides of the head logic unit 10, respectively. The first data processing unit 21 and the second data processing unit 23 convert each format of the first group data and the second group data, which are transmitted via the first data bus and the second data bus, respectively, into a format adapted to be processed by the nozzle driving unit 30.

The first data processing unit 21 and the second data processing unit 23 may include a shift register, a latch or a decoder, and an encoder for processing the printing data, that is, the address data and the fire data.

Figure 4:
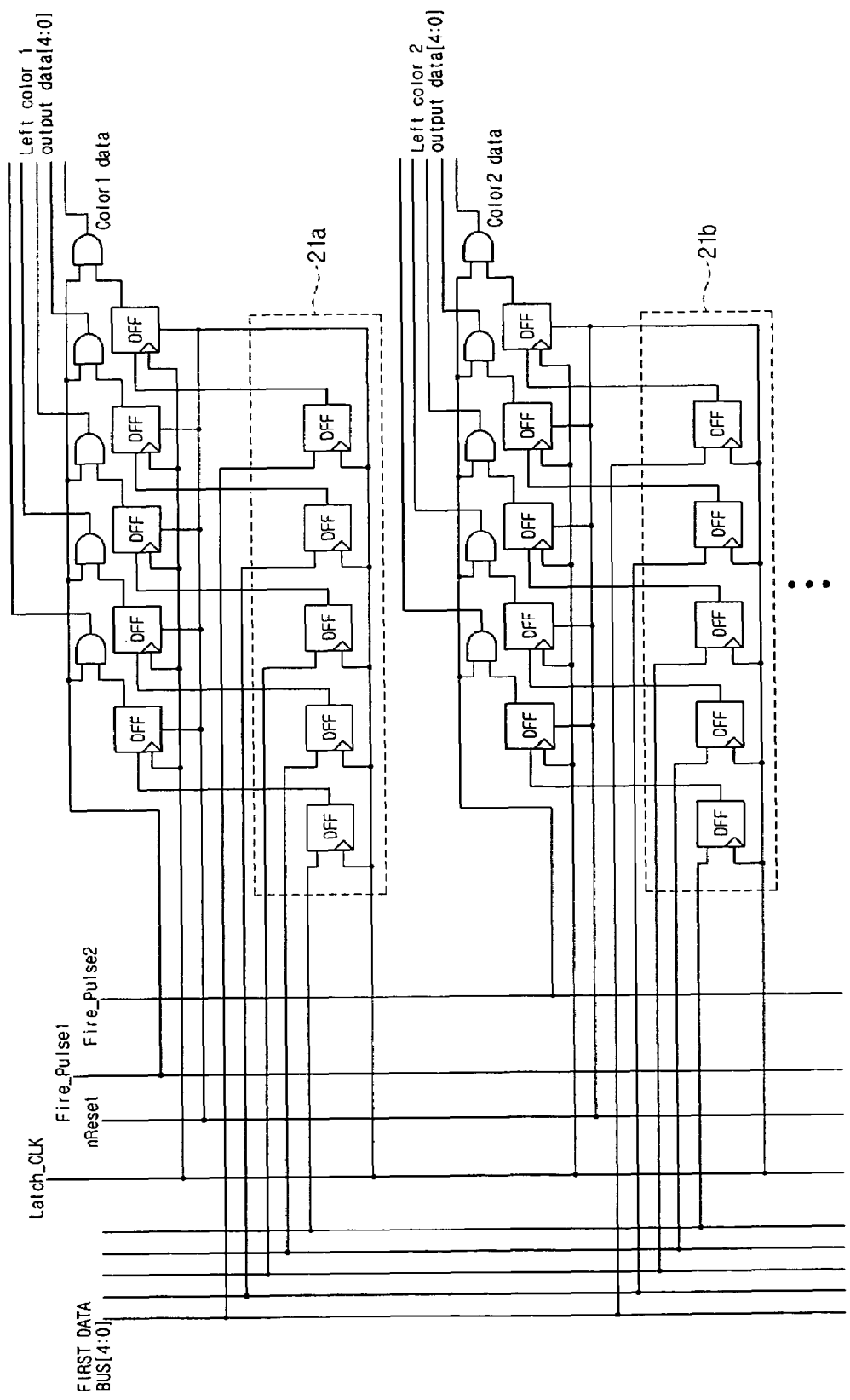
FIG. 4 is a detailed view of a data processing unit according to an exemplary embodiment of the present invention.

FIG. 4 is a detailed view of the first data processing unit 21 according to an exemplary embodiment of the present invention. FIG. 4 shows only latch and logic circuits for the purpose of convenience of explanation.

As shown in FIG. 4, the first data bus [4:0] is connected to the first data processing unit 21, and the first group data [4:0], transmitted to the first data processing unit 21 via the first data bus, are latched by latches 21a and 21b in synchronization with a latch clock synchronization signal output from the head logic unit 10. The latched first group data [4:0] are loaded into DFFs by a load signal and then adjusted in accord with an output format of the nozzle driving unit 30.

Here, the nozzle driving unit 30 may be implemented by a field effect transistor (FET) array being turned on/off according to an output signal of the data processing unit 20 to apply a voltage of Vph to thermal elements of the nozzles, thereby discharging ink from a relevant nozzle. The nozzle driving unit 30 includes color '1' to '4' nozzle driving units 31, 33, 35 and 37 corresponding to colors of cyan, magenta, yellow and black.

At this time, the data are processed in parallel in the second data processing unit 23 in a manner similar to the process in the first data processing unit 21. Accordingly, the head driving device 200 according to an exemplary embodiment of the present invention may relatively adjust the data processing speed by receiving and processing high speed serial data and dividing the processed serial data. That is, the head driving device 200 can receive the serial data at a high speed and processes the serial data at a low speed.

Figure 5:
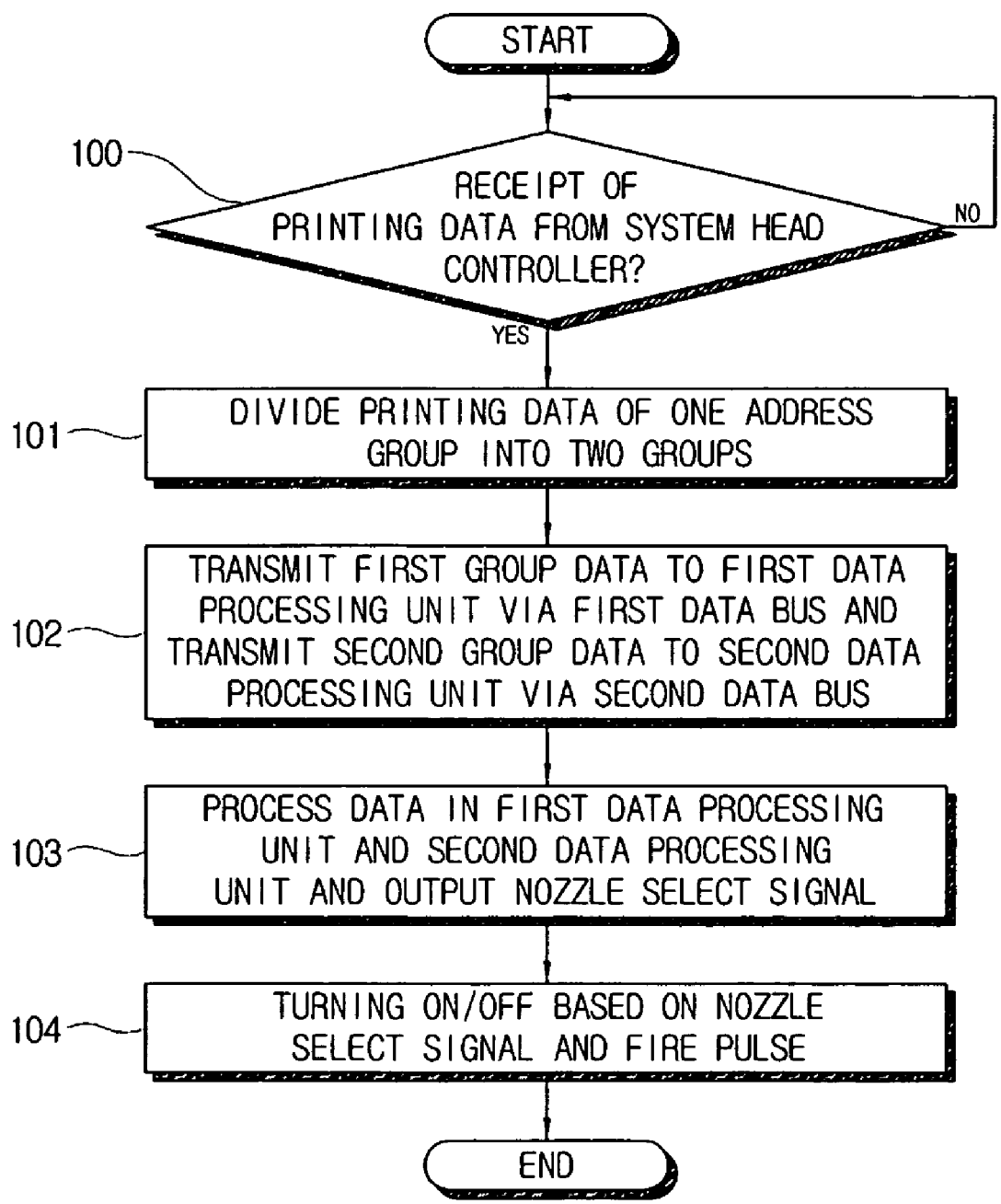
FIG. 5 is a control flowchart illustrating a data processing method of the inkjet printer according to an exemplary embodiment of the present invention.

Now, a data processing method of the head driving device 200 of the inkjet printer according to an exemplary embodiment of the present invention will be described with reference to FIG. 5.

The head logic unit 10 receives serial printing data from the system head controller 100 at operation 100, converts the received serial printing data into parallel data in synchronization with a serial clock synchronization signal and divides the printing data of one address group output at a time into two groups, that is, first group data and second group data at operation 101.

Then, the first group data and the second group data are transmitted to the first data processing unit 21 and the second data processing unit 23 via the first data bus and the second data bus separated from each other, respectively, at operation 102.

The transmitted printing data are processed in parallel in the first data processing unit 21 and the second data processing unit 23 based on a load signal and a latch clock synchronization signal output from the head logic unit 10, and then are output as a nozzle select signal at operation 103.

Then, the output nozzle select signal is applied to the nozzle driving unit 30 according to a fire pulse, and ink is discharged according to turning on/off of the nozzle driving unit 30 at operation 104.

Thus, the data may be transmitted and processed at the same speed via a fewer number of data buses in one area.

As apparent from the above description, the exemplary embodiments of the present invention provides a head driving device, an inkjet printer comprising the same, and a data processing method thereof, capable of improving an EMI characteristic between signals by lowering the density of data buses in one area, and adjusting a data processing speed by dividedly processing printing data.

While the invention has been shown and described with reference to certain exemplary embodiments thereof, it will be understood by those skilled in the art that various changes may be made therein without departing from the spirit and scope of the invention as defined in the appended claims and their equivalents.

What is claimed is:

1. A head driving device of an inkjet printer, comprising:
   a nozzle driving unit for turning at least one of on and off a plurality of thermal elements that correspond to a plurality of nozzles and heat ink discharged from the plurality of nozzles;
   a data processing unit for processing printing data and outputting a nozzle select signal corresponding to an image to the nozzle driving unit; and
   a head logic unit for receiving the printing data externally, dividing the printing data of at least one address group into a plurality of data groups, transmitting the divided plurality of data groups to the data processing unit via different data buses corresponding to the divided plurality of data groups, respectively, and controlling the data processing unit to process the divided printing data.

2. The head driving device according to claim 1, wherein the data buses corresponding to the divided plurality of data groups are arranged separately for the respective data groups.

3. The head driving device according to claim 2, wherein the head logic unit divides the printing data of at least one address group into first group data and second group data, and
   wherein the data buses comprises a first data bus which the first group data are transmitted and a second data bus which the second group data are transmitted.

4. The head driving device according to claim 3, wherein the data processing unit comprises a first data processing unit for processing the first group data transmitted via the first data bus and a second data processing unit for processing the second group data transmitted via the second data bus, the first data processing unit and the second data processing unit being arranged separately.

5. The head driving device according to claim 4, wherein the first data processing unit and the second data processing unit are arranged in left and right sides of the nozzle driving unit, respectively.

6. The head driving device according to claim 5, wherein the data processing unit comprises a shift register for delaying the nozzle select signal corresponding to the image to be recorded, according to a clock synchronization signal, and a latch for latching the nozzle select signal according to a latch clock.

7. The head driving device according to claim 6, wherein the head logic unit converts serial data transmitted externally into parallel data.

8. The head driving device according to claim 4, wherein the data processing unit comprises a shift register for delaying the nozzle select signal corresponding to the image to be recorded, according to a clock synchronization signal, and a latch for latching the nozzle select signal according to a latch clock.

9. The head driving device according to claim 8, wherein the head logic unit converts serial data transmitted externally into parallel data.

10. An inkjet printer comprising:
    a system head controller for processing printing data transmitted externally; and
    a head comprising a nozzle driving unit for turning at least one of on and off a plurality of thermal elements that correspond to a plurality of nozzles and heat ink discharged from the plurality of nozzles, a data processing unit for processing the printing data and outputting a nozzle select signal corresponding to an image to the nozzle driving unit, and a head logic unit for receiving the printing data from the system head controller, dividing the printing data of at least one address group into a plurality of data groups, transmitting the divided plurality of data groups to the data processing unit via different data buses corresponding to the divided plurality of data groups, respectively, and controlling the data processing unit to process the divided printing data.

11. The inkjet printer according to claim 10, wherein the data buses corresponding to the divided plurality of data groups are arranged separately for the respective data groups.

12. The inkjet printer according to claim 11, wherein the head logic unit divides the printing data of at least one address group into first group data and second group data,
    wherein the data buses comprises a first data bus which the first group data are transmitted and a second data bus which the second group data are transmitted, and
    wherein the data processing unit comprises a first data processing unit for processing the first group data transmitted via the first data bus and a second data processing unit for processing the second group data transmitted via the second data bus, the first data processing unit and the second data processing unit being arranged separately.

13. The inkjet printer according to claim 12, wherein the first data processing unit and the second data processing unit comprises a shift register for delaying the nozzle select signal corresponding to the image to be recorded, according to a clock synchronization signal, and a latch for latching the nozzle select signal according to a latch clock.

14. The inkjet printer according to claim 13, wherein the first data processing unit and the second data processing unit are arranged in left and right sides of the nozzle driving unit, respectively.

* * * * *

UNITED STATES PATENT AND TRADEMARK OFFICE
CERTIFICATE OF CORRECTION

PATENT NO. : 7,588,303 B2  Page 1 of 1
APPLICATION NO. : 11/519782
DATED : September 15, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 206 days.

Signed and Sealed this

Twenty-first Day of September, 2010

David J. Kappos
*Director of the United States Patent and Trademark Office*